United States Patent [19]

Schaub et al.

[11] Patent Number: 4,778,051
[45] Date of Patent: Oct. 18, 1988

[54] BOOK-LIKE HOLDER AND METHOD FOR MAKING BOOK-LIKE HOLDERS

[75] Inventors: Merlin R. Schaub, St. Louis Park; D. Mark Hector, Hopkins; Rodney T. Herdina, Centerville, all of Minn.

[73] Assignee: Sunrise Plastics, Inc., Arden Hills, Minn.

[21] Appl. No.: 864,714
[22] Filed: May 19, 1986
[51] Int. Cl.4 .................... B65D 85/672; B32B 31/04
[52] U.S. Cl. ................................ 206/387; 156/250; 156/258; 206/472; 206/564
[58] Field of Search ............... 206/309, 311, 312, 313, 206/232, 387, 444, 472, 459; 156/250, 256, 258; 220/339; 281/29, 31, 36

[56] References Cited

U.S. PATENT DOCUMENTS

| D. 226,146 | 1/1973 | Price | D87/1 |
| D. 279,762 | 7/1985 | Yoshizawa | D9/305 |
| 667,495 | 2/1901 | Butler . | |
| 709,687 | 9/1902 | Vernon . | |
| 748,631 | 1/1904 | Mitchell . | |
| 2,369,864 | 2/1945 | Spaldo | 281/34 |
| 2,788,041 | 4/1957 | Carver | 150/39 |
| 2,883,061 | 4/1959 | Moore | 211/13 |
| 3,028,949 | 4/1962 | Sohosky | 206/83 |
| 3,092,400 | 6/1963 | Smith | 218/19 |
| 3,190,678 | 6/1965 | Peterson et al. | 281/29 |
| 3,215,450 | 11/1964 | Peterson et al. | 218/29 |
| 3,315,718 | 4/1967 | Berman . | |
| 3,335,847 | 8/1967 | Murphy et al. | 206/387 |
| 3,414,181 | 12/1968 | Sloan | 229/2.5 |
| 3,487,919 | 1/1970 | Elliott et al. | 206/387 |
| 3,640,379 | 2/1972 | Weingarden | 206/387 |
| 3,737,067 | 6/1973 | Palson | 220/60 |
| 3,743,081 | 7/1973 | Roberg et al. | 206/387 |
| 3,814,527 | 6/1974 | Lawes | 402/3 |
| 3,902,598 | 9/1975 | Koob et al. | 206/387 |
| 4,011,940 | 3/1977 | Neal et al. | 206/1.5 |
| 4,049,119 | 9/1977 | Wilson | 206/387 |
| 4,054,206 | 10/1977 | Kobayashi et al. | 207/387 |
| 4,078,657 | 3/1978 | Schurman | 206/387 |
| 4,102,452 | 7/1978 | Sato et al. | 206/387 |
| 4,127,189 | 11/1978 | Shumrak et al. | 206/520 |
| 4,184,594 | 1/1980 | Hehn | 206/387 |
| 4,231,474 | 11/1980 | Takahashi | 206/387 |
| 4,287,989 | 9/1981 | Plummer | 206/387 |
| 4,341,307 | 7/1982 | Shyers | 206/387 |
| 4,363,403 | 12/1982 | Raucci, Jr. et al. | 206/387 |
| 4,383,607 | 5/1983 | Lordahl et al. | 206/45.34 |
| 4,407,410 | 10/1983 | Graetz et al. | 206/387 |
| 4,432,827 | 2/1984 | Graetz et al. | 156/245 |
| 4,469,225 | 9/1984 | Takahashi | 206/387 |
| 4,496,048 | 1/1985 | Sykes | 220/339 |
| 4,623,062 | 11/1986 | Chase et al. | 206/312 |

FOREIGN PATENT DOCUMENTS

| 3324126 | 1/1985 | Fed. Rep. of Germany | 206/387 |
| 3335558 | 4/1985 | Fed. Rep. of Germany | 206/387 |
| 2503667 | 10/1982 | France | 206/387 |
| 2514187 | 4/1983 | France | 206/387 |
| 2038164 | 7/1980 | United Kingdom | 206/387 |

OTHER PUBLICATIONS

Supplemental Declaration of Merlin R. Schaub (1/19/87).
Supplemental Declaration of D. Mark Hector (1/19/87).

Primary Examiner—Jimmy G. Foster
Attorney, Agent, or Firm—Kinney & Lange

[57] ABSTRACT

A book-like storage container for cassettes or the like is formed from a single thermoplastic sheet of PVC plastic which has a pair of stackable trays formed on an inner face thereof that are connected together by an integral spine in side-by-side relation. Each tray is defined by C-shaped walls and the spine has flanges adjacent each end thereof for interlocking with the interfitting walls of the trays when the holder is in a closed position to form an enclosure therein. The PVC sheet has a living hinge defined therein along the connecting edges of the spine and each of its respective trays. In a preferred embodiment, a second thermoplastic sheet of flexible vinyl is placed back-to-back with the PVC sheet and thermally bound thereto about the sheets' peripheries. The PVC sheet is notched at the intersection of each living hinge and the periphery of the PVC sheet, so that when the peripheries of the PVC sheet and vinyl sheet are thermally bound together, there is no thermal seam at those notches. During the heat sealing step of holder formation, the vinyl sheet is gathered toward the spine section thereof by urging it down between the living hinges of the PVC sheet. This aids in eliminating wrinkling of the vinyl sheet and in keeping it properly formed in all opened and closed positions of the holder.

30 Claims, 3 Drawing Sheets

U.S. Patent  Oct. 18, 1988  Sheet 1 of 3  4,778,051
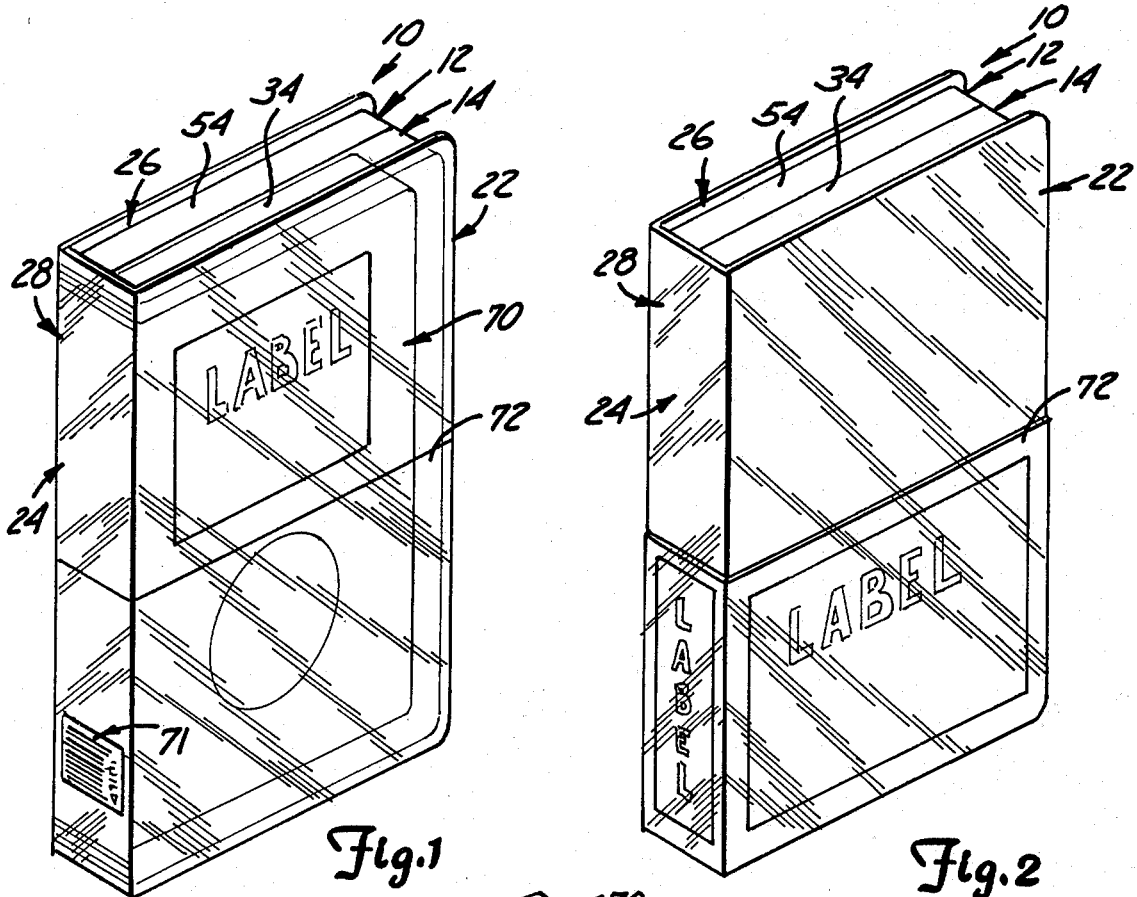
Fig. 1
Fig. 2
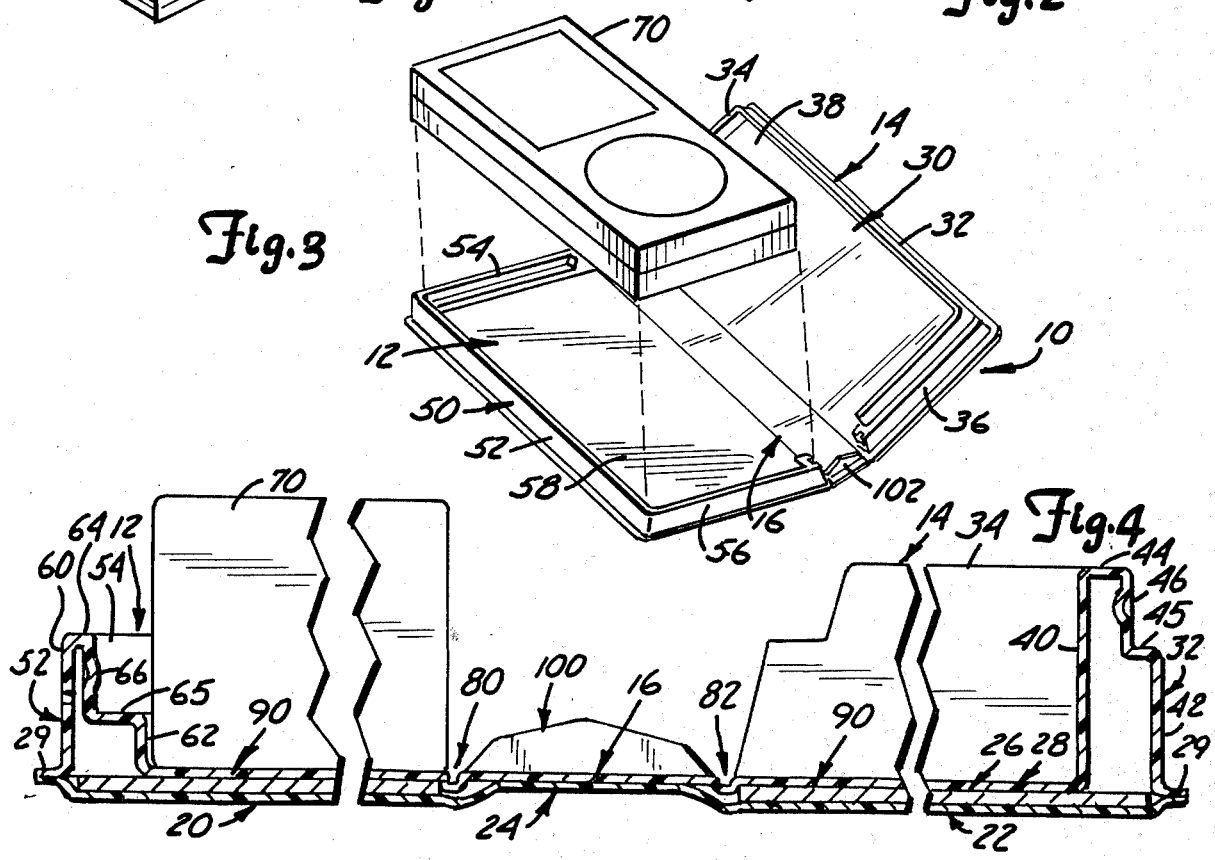
Fig. 3
Fig. 4

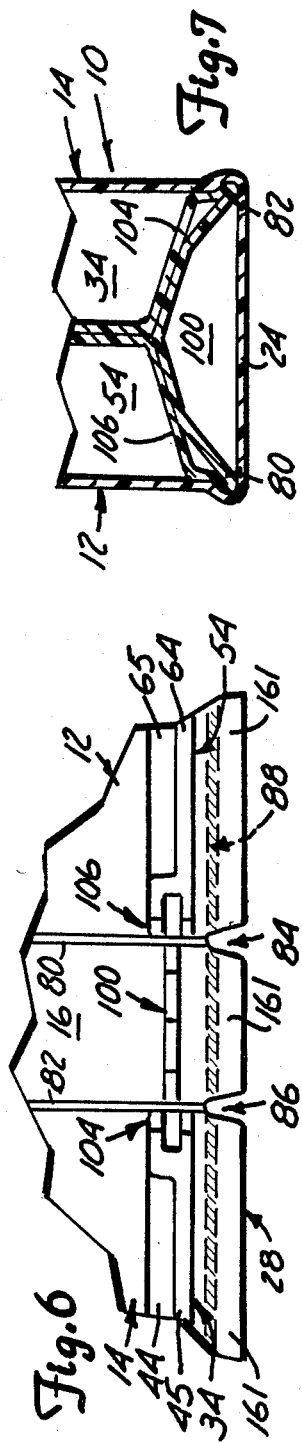
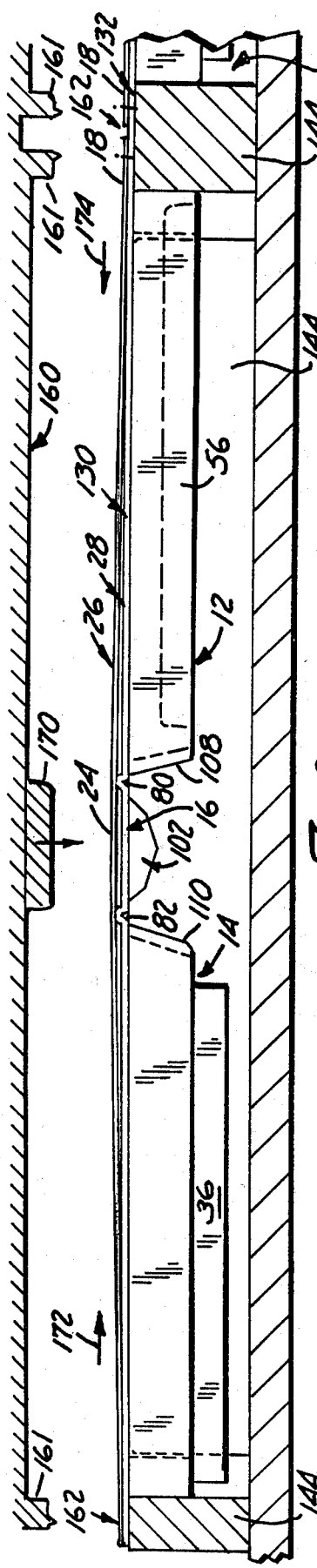
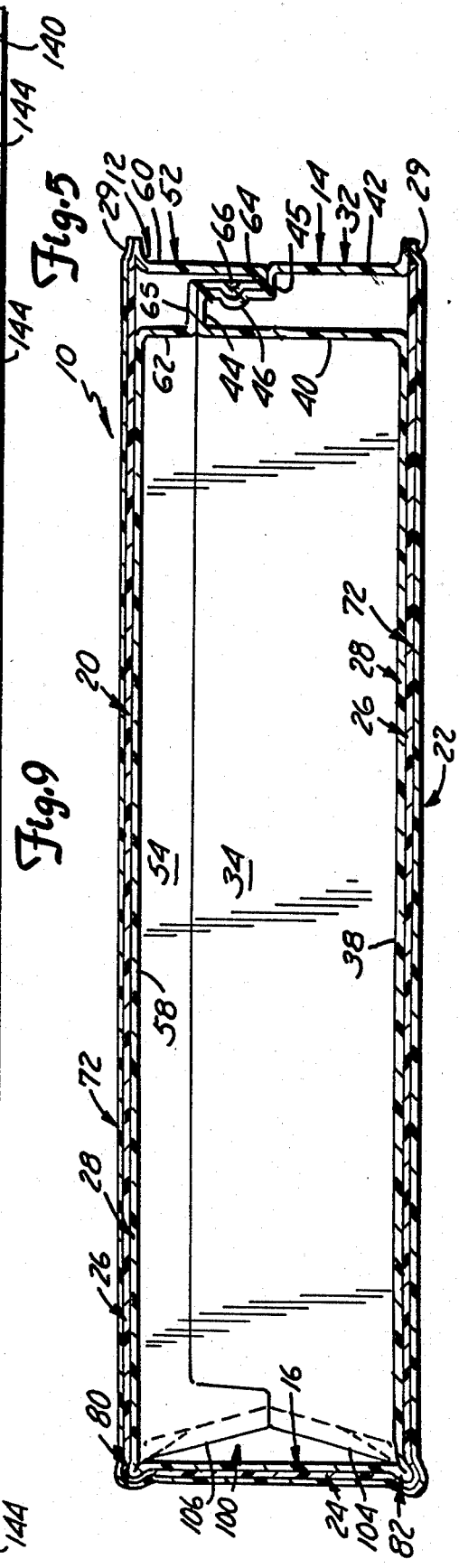

BOOK-LIKE HOLDER AND METHOD FOR MAKING BOOK-LIKE HOLDERS

BACKGROUND OF THE INVENTION

1. Field of the Invention.

This invention relates to book-like holders or albums, and specifically to a holder which is compact, economical, easy loading, having a durable hinge-like construction and creating a substantially dust-free environment for an article held therein, and also to a method for making such holders.

2. Description of the Prior Art.

Many prior conventional style albums or containers for cassettes (audio or video tape) have had a four-sided interior wall design and two tray PVC plastic parts (male and female) which are die cut into two separate sections. The two sections are then heat sealed into an album format. The male section acts as a regular tray that is heat sealed onto a plasticized vinyl back cover of the album, which houses the actual cassette. With this style, a cassette can only be loaded into the album by placing it within the four walls of the male tray section. The female tray section acts as a dust cover that is mounted inside the front cover of the album, and nests onto or into the back cover (male tray) to form a dust-proof enclosure album construction. The four inner walls of the male tray section hold the cassette in place, making it hard to load and unload the cassette. It also makes it hard to locate the front cover tray with the back cover tray when closing the album.

Such cassette albums have been formed by molding the PVC plastic tray sections in a multiple-up thermal forming stage, and then die cutting the two tray sections apart. The two tray sections are then taken into a heat sealing operation where they are bonded together with an outside vinyl lining which constitutes the album cover. Often, board liners are placed behind each tray section and also as stiffeners for the spine which is formed to bind the tray sections in a book-like manner. In the prior cassette albums, the tray sections were heat sealed (bonded) to the vinyl cover, with the hinges along the edges of the spine being two pieces of parallel bonded vinyl. Through normal wear and tear, and especially in cold weather conditions, this created a tendency for the vinyl to crack or split along the spine.

Examples of these types of vinyl-backed cassette containers are shown in the following patents:

| U.S. Pat. No. | Inventor | Issued |
| --- | --- | --- |
| 3,315,718 | C. H. Berman | 4/25/67 |
| 3,640,379 | Weingarden | 2/8/72 |
| 3,743,081 | Roberg et al. | 7/3/73 |
| 4,341,307 | Shyers | 7/27/82 |

Another prior art holder is shown in U.S. Pat. Nos. 4,407,410 (issued 10/4/83) and 4,432,827 (issued 2/21/84), both to Graetz et al. The holder of this design had the trays formed from an inner thermoplastic sheet integrally with a spine liner between them. The inner sheet was then heat bonded to an outer thermoplastic cover sheet, but not along the length of the spine, and the spine bowed outwardly when the holder was closed. Even with this design, however, the inner sheet cracked along the spine.

The four wall construction of the album trays of such prior art cassette containers also created a constraint on the ability to reduce the size of such containers. Size is a critical feature in bulk storage of such containers and cassettes therein, and also in allotting shelf space in facilities which might use such containers, such as video cassette sale or rental stores.

In addition, no prior method was known for forming a book-like container which allowed for the use of transparent materials so that the edge of a cassette or the like contained therein is visible to the extent a bar code reader can be operated through the container to read coded information on the edge of the cassette itself. Such a feature is useful not only to create time savings in handling such album-contained cassettes, but also so that the cassette may be viewed to determine its contents and to determine whether it has been damaged or properly rewound.

Existing vinyl-backed cassette holders have thus been bulky, hard to load and unload, expensive and not sufficiently durable to hold up well in an environment where constantly handled, such as the retail video tape rental market.

SUMMARY OF THE INVENTION

The present invention provides a book-like container (and method for making same) which overcomes the above-referenced disadvantages of such prior art schemes. The container of the present invention is extremely durable, can be formed from completely transparent materials, is smaller in overall size than prior containers for cassettes and the like, is extremely easy to load and unload with a cassette, and provides a substantially dust-free environment for a cassette therein when the holder is in its closed storage position.

The book-like holder of the present invention includes a one-piece molded sheet having integral tray portions and an integral spine liner section between the tray portions connecting the tray portions in laterally spaced side-by-side relation. Each tray portion has a raised wall section projecting therefrom with the wall sections of the tray portions being formed to interlock together and define the edges of a hollow enclosure in the holder in combination with the spine liner section when the holder is in its closed position. The molded sheet also has lowered ridge portions defining the spaced connecting edges of the spine liner section and tray portions thereof and creating a living hinge between the spine liner section and its respective tray portions.

In a preferred embodiment, the holder also includes a one-piece flexible sheet having integral first and second flap portions and an integral spine cover section between the flap portions connecting the flap portions in laterally spaced side-by-side relation. The molded and flexible sheets are aligned so that each of the flap portions covers an outer face of one of the tray portions and the spine cover section covers an outer face of the spine liner section. The molded and flexible sheets are bound together around the peripheries thereof, resulting in a book-type holder with front and rear cover panels, interlocking trays on the inner faces of the cover panels, and a spine connecting the cover panels.

In the preferred embodiment, the molded and flexible sheets are bound together around the peripheries thereof except at points immediately adjacent to the lower ridge portions. The molded and flexible sheets are also preferably transparent and the flexible sheet is plasticized vinyl and the molded sheet is PVC plastic. The vinyl is more pliable than the PVC plastic and the sheets are bound together by a thermal seal bond about their peripheries.

In the preferred embodiment, the raised wall sections projecting from each tray portion are integrally formed from the second sheet in a C-shape. A raised stub wall portion projects from adjacent each of the end edges of the spine liner section and is aligned for interfitting engagement with adjacent raised wall sections of the tray portions when the holder is in its closed position, thus forming a substantially dust-free enclosure within the holder. In one preferred embodiment of the holder of the present invention, a rigid stiffener panel is mounted between the flap portion of each flexible sheet and the tray portion of each molded sheet, with the panel abutting one of the lower ridge portions formed in the molded sheet.

The method of making a book-like holder of the present invention starts with the step of thermal forming a first thermoplastic sheet to define a pair of adjoining stackable trays on a first side of the first sheet. These trays are aligned in side-by-side relation and connected by an integral spine liner section. The thermal forming also defines a pair of parallel raised ridges on a second side of the first sheet, with each of the raised ridges creating a living hinge in the first sheet extending along and defining connecting edges of the spine liner section and its respective trays. The first sheet is then covered with a second thermoplastic sheet, and then a spine cover section of the second sheet is urged toward the first sheet between the parallel raised ridges thereof. The peripheries of the first and second sheets are heat sealed together to provide a book-type holder with two cover panels, interlocking trays on the inner faces of the cover panels and a spine connecting the cover panels.

In a preferred embodiment of the method of the present invention, after thermal forming, a notch is cut out of the periphery of each first sheet at the intersection of each raised ridge with the periphery of the first sheet. The heat sealing of the peripheries of the first and second sheets is thus completed except at the notches in the periphery of the first sheet.

In the preferred embodiment of the method of the present invention, the first thermoplastic sheet is thermal formed in a multiple-up arrangement to define a first set of at least two pairs of adjoining stackable trays on a first side of the first sheet, with the trays of each pair of trays in side-by-side relation and connected by an integral spine liner section and with the pairs of trays in tray side-by-side relation and connected by peripheral marginal portions of the first sheet therebetween. The thermal forming also defines a pair of parallel raised ridges for each pair of trays on a second side of the first sheet, with each of the raised ridges creating a living hinge in the first sheet extending along and defining connecting edges of each spine liner section and its respective trays. Next, at least two first sets of pairs of trays are aligned in first set side-by-side relation. This defines a plurality of second sets of adjacent pairs of trays in tray end-to-end relation. Each second set of adjacent pairs of trays are then covered in tray end-to-end relation with a separate second thermoplastic sheet, and spine cover portions of the second sheet are urged toward each first sheet therebelow between the parallel raised ridges of those first sheets. The first and second sheets are then heat sealed together around the peripheral margins of each pair of trays, and the adjoining pairs of trays are severed along the heat sealed margins to provide a plurality of book-type holders, each with two cover panels, interlocking trays on the inner faces of the cover panels and a spine connecting the cover panels.

BRIEF DESCRIPTION OF THE DRAWINGS

FIG. 1 (Sheet 1) is a perspective view of a fully transparent holder of the present invention in its closed position.

FIG. 2 (Sheet 1) is a perspective view of an opaque holder of the present invention (having labels in an external transparent pocket) in its closed position.

FIG. 3 (Sheet 1) is a perspective view of a holder of the present invention in a partially opened position, as viewed from the inside and showing a cassette aligned for placement in the holder.

FIG. 4 (Sheet 1) is a sectional view of the holder of the present invention in a fully opened position, with portions of each cover panel (having a stiffener therein) thereof broken away.

FIG. 5 (Sheet 2) is a sectional view of the holder of the present invention in its closed position, with no stiffeners in the holder cover panels).

FIG. 6 (Sheet 2) is a partial bottom plan view of the inner side of the inner thermoplastic sheet of the holder of the present invention adjacent one end of the integral spine liner section thereof.

FIG. 7 (Sheet 2) is a partial sectional view of the holder of the present invention, with the section taken through one of the flange stub walls extending inwardly from the inner face of the spine of the holder.

FIG. 9 (Sheet 2) is a sectional view through the die of the heat seal, vinyl gathering and cut station in the holder making process.

DETAILED DESCRIPTION OF THE PREFERRED EMBODIMENTS

Figure 8:
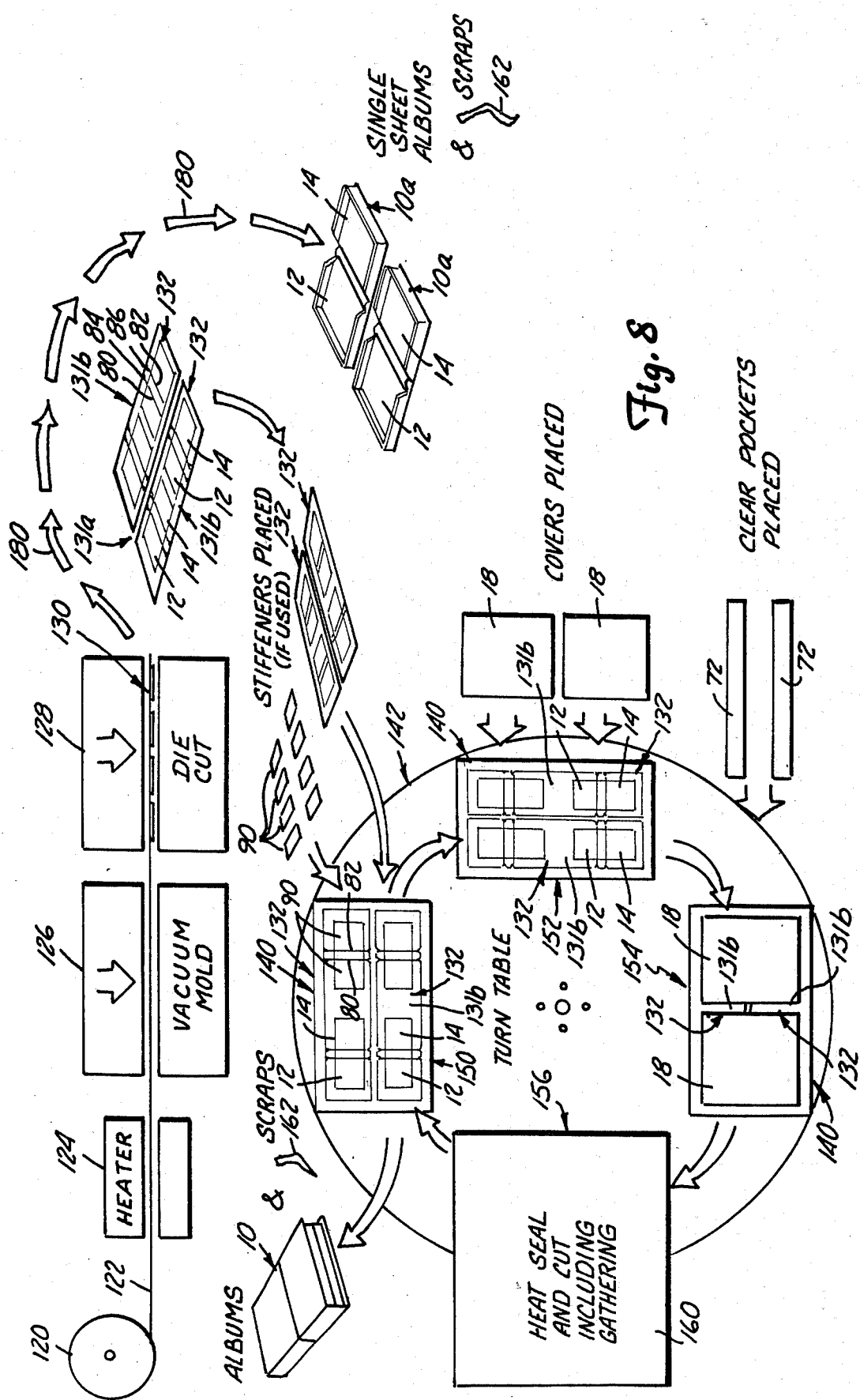
FIG. 8 (Sheet 3) is a diagramatic process diagram illustrating the method of making the holders of the present invention.

The holder 10 has a pair of relatively rigid interfitting tray portions 12 and 14 which are stacked together in the closed position as shown in FIGS. 1, 2 and 5, and which are separated in spaced parallel side-by-side relation by an integral spine liner section 16 when the holder is in its flat opened position of FIG. 4 (and partially open position seen in FIG. 3). In one embodiment, a cover 18 has a first flap portion 20 overlying the tray 12 and a second flap portion 22 overlying the tray 14, with an integral spine section 24 connecting the flap portions 20 and 22.

Trays 12 and 14 are formed by thermal vacuum molding of a single first thermoplastic sheet 26. Peripheral margins of the first thermoplastic sheet 26 with the tray portions 12 and 14 formed thereon and the complimentary cover 18 are bound together. Preferably, the cover 18 is formed from a second thermoplastic sheet 28 and the first and second sheets 26 and 28 are are bound together by a thermal seal which creates a peripheral seam 29 therebetween. When so bound, the spine section 24 overlays the spine liner section 16 as well. A book-type holder is thus provided with front and rear cover panels, interlocking trays on the inner faces of the cover panels and a spine connecting the cover panels.

Molded tray portion 14 of the second sheet 28 has a stepped raised hollow peripheral wall section 30 which is C-shaped to run along the peripheral edges of the tray portion 14, except for that edge adjacent the spine liner section 16. The wall section 30 thus includes an outer wall 32 and integral top and bottom walls 34 and 36, all of which surround a planar side wall 38 which consists of the inner face of the tray portion 14.

Each wall of the wall section 30 has a flat inner face 40 with a flat shoulder 44 on top thereof, and a stepped upstanding outer face 42 with a horizontal rim 45 intermediate the height of the outer face 42 of the wall section 20. The outer face 42 on the outer wall 32 has at least two dimple recesses 46 just above the rim 45 thereon which are preferably positioned proximate the top and bottom walls 34 and 36.

The other molded tray portion 12 of the second sheet 28 provides, in effect, a lid for the tray portion 14 and also has an upstanding hollow peripheral wall section 50 integrally formed thereon. The wall section 50 is also C-shaped and extends along the peripheral edges of the tray portion 12, except for that edge adjacent the spine liner section 16. The wall section 50 includes an outer wall 52 and integral top wall and bottom walls 34 and 56, all of which surround a planar side wall 58 which consists of the inner face of the tray portion 12.

Each wall of the wall section 50 has a flat outer face 60 with a flat shoulder 64 on top thereof, and a stepped inner face 62 with a horizontal rim 65 intermediate the height of the inner face 62 of the wall section 50. The stepped inner face 62 of the wall section 60 is sized to interfit and snuggly mate with the stepped outer face 42 of the wall section 30 with the shoulder 64 resting on the rim 45 and the shoulder 44 resting on the rim 65 when the trays 12 and 14 are in closed stacked condition as shown in FIGS. 1, 2 and 5. The stepped inner face 62 on the outer wall 52 preferably has projecting nibs 66 therein aligned to be received in the dimple recesses 46 when the trays 12 and 14 are stacked as shown in FIG. 5. The interfitting projections 46 and 66 snap together as the book-type holder is closed to hold the trays 12 and 14 in closed sealed stacked relation. The wall sections 30 and 50 are sufficiently flexible to accommodate the snapping together and the unsnapping of the dimple recesses 46 and nibs 66.

As best seen in FIG. 5, when the holder 10 is in its closed position the inner faces 40 and 62 of the wall sections, side walls 38 and 58 of the tray portions and the planar inner face of the spine liner section 16 combine to form an enclosure for a cassette or the like in the holder. When the holder 10 is in its closed position, the generally parallel spine liner section 16 and inner faces 40 and 62 are generally perpendicular to the generlly parallel side walls 38 and 58. The overall size (width and height) of the holder 10 is substantially reduced by using the inner surface of the spine liner section 16 as an inner wall of the enclosure, rather than placing or forming an additional inner wall on each tray portion 12 and 14. The enclosure is also of size to closely mate with the exterior shape of a cassette, such as a VHS video cassette. Such a cassette 70 is illustrated in FIGS. 1, 3 and 4 in various positions relative to the holder 10.

The C-style tray configuration eliminates the necessity for an inner wall on each tray portion and allows the cassette 70 to rest flush to the spine liner section 16 when the holder is in its closed position. A cassette fitted in one of the tray portions of the present invention is not dropped into a four-sided recess as in prior art designs, but is easily and quickly aligned within the respective C-shaped wall section of the present invention. The present invention thus provides quick access and easy loading and unloading of the cassette 70 within the holder 10. The cassette 70 can be loaded in either tray portion 12 or 14, with the cassette 70 automatically locating itself to the inner face of the spine liner section 16 when the holder 10 is moved to its closed position to interlock the wall sections 30 and 50. The wall sections 30 and 50 are sufficiently high to retain a cassette in place on either tray portion 14 or 12 while the holder 10 is being closed. Preferably, the height of the wall section on each tray portion is at least half the width of the spine liner section 16.

The first thermoplastic sheet 26 preferably comprises a rigid Polyvinyl Chloride (PVC) sheet or film material of approximately 0.015 inch thickness, and the second thermoplastic sheet preferably comprises a plasticized vinyl sheet of approximately 0.012 to 0.015 inch thickness, and which is more flexible than the PVC sheet. In a preferred embodiment of the present invention, the first and second thermoplastic sheets are transparent. In such a holder, since the cassette retained therein is visible through the walls of the holder, identifying labels on the holder may be unnecessary. Because the edge of a cassette 70 abuts an inner surface of the spine of the holder when closed, a bar code label 71 (see FIG. 1) on the edge of the cassette 70 is accurately readable through the spine of the transparent holder 10.

Whether or not the first and second sheets 26 and 28 are transparent, a third transparent thermoplastic sheet 72 may be aligned to overlay a portion of the cover 18 of the holder 10, as seen in FIGS. 1, 2 and 5. The third transparent sheet 72 overlies a bottom half of the cover 18, being wrapped around both flap portions 20 and 22 and the spine section 24 of the cover 18 and bonded at its ends and at its bottom to adjacent side and bottom peripheral edges of the cover. The third sheet 72 is preferably a vinyl material of approximately 0.006 inch thickness which is even more flexible and stretchable than the first vinyl sheet 26, with the third sheet 72 heat sealed to the first and second thermoplastic sheets 26 and 28 along the peripheral seam 29. The third transparent sheet 72 thus provides an outer transparent envelope for the reception of labels or other identifying material (as seen in FIG. 2) to identify the cassette retained within the hollow enclosure of the holder 10.

The spine liner section 16 formed in the second thermoplastic sheet is connected to its respective tray portions 12 and 14 by a pair of living hinges. At the same time the tray portions 12 and 14 are thermal vacuumed molded to create the upstanding hollow peripheral wall sections 30 and 50 on one side thereof, a pair of parallel ridge portions 80 and 82 are formed to be upstanding on the other side thereof. Each of these ridge portions 80 and 82 act to define the spaced connecting edges of the spine liner section 16 and its respective tray portions 12 and 14, as seen in FIGS. 4, 5 and 6. The ridge portions 80 and 82 are formed to permit the inner faces of the trays 12 and 14 and spine liner section 16 to be generally coplanar when the holder 10 is open to a position wherein the cover panels thereof are generally coplanar, as seen in FIG. 4. The ridge portions 80 and 82 are precisely formed to create living hinges which allow the wall sections 30 and 50 of the tray portions 14 and 12 to interlock together when the holder 10 is placed in its closed position, as seen in FIG. 5. The use of specifically formed living hinges reduces stress and helps eliminate cracking of the second sheet 28.

The ridge portions 80 and 82 formed in the second thermoplastic sheet 28 are not thermal bound to the first thermoplastic sheet 26, thereby further reducing the likelihood of cracking or tearing along the living hinges.

In addition, after thermal vacuum molding of the second thermoplastic sheet 28, the sheet is die cut for further processing, and at that time, notches 84 and 86 are cut out of the periphery of the second sheet 28 at each intersection of the ridge portions 80 and 82 therewith, as seen in FIG. 6. The notches 84 and 86 are provided to eliminate heat sealing across the living hinges of the ridge portions 80 and 82. This serves to further eliminate minor cracks in the thermoplastic sheets. The thermal bond area adjacent the peripheral margin of the second thermoplastic sheet 28 is illustrated as the shaded phantom area 88 in FIG. 6 (once bonded to the first sheet 26, area 88 constitutes the peripheral heat seal seam 29). As shown, the notches 84 and 86 prevent any sections of the ridge portions 80 and 82 from being subject to the thermal bonding process, thereby retaining the purity of the living hinge in the second thermoplastic sheet and not subjecting it to thermal stresses, or the stress of being bound to the first thermoplastic sheet.

The cover panel and spine of the holder 10 are relatively rigid because of the use of the PVC plastic. The holder 10 is rigid enough to stand alone on edge when closed (even without a cassette therein). Additional rigidity in the cover flaps is achieved by insertion of a rigid stiffener panel 90 between the opposed flap and tray portion of each cover panel of the holder 10. The rigid stiffener panel 90 may be formed of cardboard, chip board or the like and a stiffener panel 90 is typically positioned in each cover panel of the holder 10 as seen in FIG. 4. The panels 90 also assist in keeping the first sheet 26 taut and wrinkle-free. The ridge portions 80 and 82 advantageously provide a surface against which an edge of each rigid stiffener panel 90 abuts when sandwiched between the first and second thermoplastic sheets 26 and 28, as also seen in FIG. 4. No such panel need necessarily be placed between the sheets along the spine of the holder 10, however.

The spine liner section 16 has a pair of spaced top and bottom flange stub walls 100 and 102 integrally thermal vacuum formed thereon. The flange stub walls are generally parallel and extend outwardly from the same side of the second thermoplastic sheet as the wall sections 30 and 50. In fact, the flange stub walls 100 and 102 are formed adjacent the ends of the spine liner section 16, with the top flange stub wall 100 in alignment parallel to opposed top walls 34 and 54 and with the bottom flange stub wall 102 in alignment parallel to opposed bottom walls 36 and 56, to aid in aligning those walls in interfitting engagement and also to further aid in creating a rigid and stable holder 10.

Portions of the top flange stub wall 100 nest within portions of the top walls 34 and 54 when the holder 10 is placed in its closed position, and portions of the bottom flange stub wall 102 nest within portions of the bottom walls 36 and 56 when the holder 10 is placed in its closed position. This relationship with respect to the top flange stub wall 100 is seen in FIG. 5 (the overlap of nested portions is shown in phantom). Each top wall 34 and 54 has an inner end 104 and 106, respectively, adjacent the spine liner section 16 which is recessed with a fitted groove to receive portions of the top flange stub wall 100 therein when the holder 10 is in its closed position. Similarly, each bottom wall 36 and 56 has an inner end 108 and 110, respectively, adjacent the spine liner section 16 which is recessed with a fitted groove to receive portions of the bottom flange stub wall 102 therein when the holder 10 is in its closed position.

FIG. 7 is a partial sectional view of the holder 10 of the present invention when in its closed position, with the section taken through the top flange stub wall 100 and its cooperating top walls 34 and 54 to illustrate the interfitting engagement of those walls. As seen, the flange stub wall 100 is preferably formed in a generally triangular configuration, having a long base 112 extending across the inner face of the spine liner section 16 and two similar angle faces 114 and 116. Each angle face is two-faceted, having a greater slope adjacent the base 112 than at the peak where the angle faces 114 and 116 intersect. The inner ends 104 and 106 (and recesses therein) of the cooperating top walls 34 and 54 are slanted to cooperate with the facets of the angle faces 114 and 116 of the top flange stub wall 100 and lay in parallel alignment with the upper facets thereof when the holder 10 is in its closed position. These cooperating wall configurations are designed to engage and guide the spine liner section 16 and interlocking wall sections 30 and 50 into engagement when the holder 10 is placed in its closed position. The top and bottom walls are thus held by the interlocking flange stub walls in generally perpendicular alignment with the inner face of the tray portions to aid in the rigidity of the holder 10. Without the flange stub walls, the top and bottom walls would tend to bend inwardly toward the hollow enclosure.

In addition to aiding in the overal rigidity of the holder 10 and providing means for aligning the interfitting of the tray portions 12 and 14 when the holder 10 is closed, the top flange stub wall 100 also cooperates with the top walls 34 and 54, and the bottom flange stub wall 102 cooperates with the bottom walls 36 and 56, to stack together when the holder is in its closed position and form a substantially dust-free enclosure within the holder. A video tape stored within such a holder may be a one-of-a-kind tape bearing unique images. Dust and other contaminants can damage such a tape and thus it is highly desirable that any storage container be as tightly sealed as possible with respect to the elements. The flange stub walls 100 and 102 thus combine with the other components of the holder 10 to create a protective environment for an article stored within the holder 10.

Holders of the present invention are economically and accurately formed at high speeds by a method illustrated in FIG. 8. A reel 120 of rigid PVC plastic or film material 122 in sheet form is unwound to pass the sheet through a heater station 124 which softens this PVC plastic to thermal forming temperatures. The softened plastic 122 is then vacuumed formed in a vacuum mold station 126. The vacuum mold die at the mold station 126 is shaped to form a plurality of pairs of interfitting tray portions 12 and 14 and a pair of flange stub walls 100 and 102 for each spine liner section 16 therebetween on one side of the PVC plastic 122, and a plurality of pairs of ridge portions 80 and 82 on the other side of the PVC plastic 122 as described above.

The PVC plastic sheet 122 is then advanced to a next die cut station 128 where a molded tray portion sheet 130 is severed from the preceding PVC plastic sheet 122. Two pairs of tray portions 12 and 14 (for video cassette holders) can be formed in tray end-to-end relation across a sheet of PVC plastic of typical width, with the adjoining pairs of tray portions being connected by a first peripheral marginal portion 131a of the molded sheet 130. Preferably, the molded sheet 130 is of length to include at least two pairs of tray portions 12 and 14 in tray side-by-side relation, with adjoining pairs being connected by a peripheral marginal portion 131b of the molded sheet 130 (the marginal portion 131b being generally perpendicular with respect to the peripheral marginal portion 131a). In the preferred arrangement wherein two pairs of tray portions 12 and 14 are formed in tray end-to-end relation across the width of the PVC plastic 122, the die cut station 128 also severs apart the molded sheet 130 along the peripheral marginal portion 131a into two generally identical first tray sets 132, 132, each of which has at least two pairs of adjoining stackable tray portions 12 and 14 in tray side-by-side relation. The notches 84 and 86 adjacent the ridge portions 80 and 82 of each pair of tray portions 12 and 14 are also cut out at the die cut station 128.

Once formed, the first set of tray portion pairs 132 are then deposited into a support frame or "nest" 140 on a turntable 142. The frame 140 is designed to support each first set 132 in an inverted position so as to expose the hollow outer face of the molded sheet 130 to the top. A portion of the frame 140 is seen in FIG. 9, which also shows upstanding supports 144 which form the frame and combine to hold the molded sheet 130 (which comprises the thermoplastic sheet 28) in a generally flat configuration.

The turntable 142 has a plurality of support frames 140, as seen in FIG. 8. The turntable has several operational stations, and the position and functional nature of the stations can be varied depending upon the number of workers, desired production volumes, and different holder configurations to be made (e.g., with or without stiffener panels 90). In FIG. 8, a first sheet receiving station 150 is shown adjacent the top of the turntable 142. At the first station 150, two first sets 132 are aligned within the support frame 140 in tray end-to-end relation. This alignment of the first sets 132 defines a plurality of second sets of adjacent pairs of tray portions 12 and 14 in tray end-to-end relation. Stiffener panels 90 are next placed atop each tray portion, if desired, by abutting an edge of the stiffener panel 90 against one of the ridge portions 80 or 82.

As seen in FIG. 8, the turntable 142 is rotatable clockwise from the first sheet receiving station 150 to a second assembly station 152 wherein the covers 18 are laid over the first sets 132. A separate cover 18 is provided for each second set of adjacent pairs of tray portions and once the covers 18 have been applied, the turntable 142 is again rotated to a third assembly station 154 where the pocket forming third thermoplastic sheet 72 is laid over the covers 18.

Once the various components of the holder 10 have all been aligned together within a support frame 140, the turntable 142 is rotated to a fourth forming station 154 which is provided with a heat sealing, cutting and cover gathering die 160. Typically, the heat sealing and cutting portion 161 of such a die 160 constitutes a high frequency current electrode which acts to heat the thermoplastic sheets, bond them together along the seam 29 and sever from marginal scrap portions 162 adjacent thereto.

The die 160 is lowered toward the support frame 140 to engage the assembled components of the holders 10. Sealing and cutting portions 161 of the die 160 combine to heat the marginal portions of the thermoplastic sheets around the cover flaps and spine of each holder 10 and create the seam 29 and also create a tear strip adjacent thereto to define the edges of each holder 10. The thermoplastic sheets are thus bound together at the seem 29 about the periphery of each book-type holder. As seen, each support frame 140 is designed to permit the assembly and formation of four holders 10 simultaneously. This bonded multi-book unit is cut at the same time as heat-sealed to form the individual book-type holders 10 described above. Once the die 160 has completed its tasks, it is raised from the support frame 140, and the turntable 142 is rotated clockwise back to the first station 150 where the individual fully-formed holders 10 are removed from the support frame 140. Scrap portions 162 of the thermoplastic sheets which have been severed apart from the holders 10 are then removed and discarded.

In order to eliminate wrinkling of the covers 18 once bonded to the tray portions, the die 160 has a block 170 extending thereunder which, as the die 160 is lowered, engages the spine section 24 of the first thermoplastic sheet 26 (cover 18) and urges it toward the second thermoplastic sheet 28 (first set 132). The block 170 is aligned to engage the cover 18 only at points between the upstanding ridge portions 80 and 82 of the second sheet 28 therebelow. Thus, as the flexible cover 18 is pushed down between the ridge portions 80 and 82, portions of the cover 18 move inwardly toward the spine section 24 thereof (as illustrated by arrows 172 and 174 in FIG. 9) to provide sufficient cover sheet material to permit the holder 10 to be placed in its closed position without binding of the cover 18. This "gathering" of the cover 18 during the heat sealing step is necessary to eliminate wrinkling of the cover 18 and keep it relatively taunt and formed in all opened and closed positions of the holder 10.

A separate cover 18 is provided for each adjacent pair of tray portions in tray end-to-end relation because of the necessity for gathering each cover 18 during the heat sealing step. If the cover 18 were positioned to cover two or more pairs of tray portions in tray side-by-side relation, the simultaneous heat sealing and cover gathering for those pairs of tray portions would not permit the cover sheet to be gathered in opposite directions at the same time. Thus, the cover sheets as applied to the pairs of tray portions at the second assembly station 152 are split along the peripheral marginal portions 131b of adjoining pairs of tray portions on each first set 132.

A holder 10 formed by the above-described method thus provides a book-type album for video cassettes or the like from a molded plastic tray sheet with a flexible plastic cover sheet. The cover panels and spine of each holder are connected by living hinges and the two sheets are heat sealed together about their peripheries, which define each album's spine and its respective pair of cover panels. No portion of the living hinges is subjected to the heat sealing process, which eliminates the cracking and tearing which typically occurs in such vinyl/PVC plastic cassette holders. The tray portions of the holder have C-shaped interior walls and the cassette enclosure formed therein is formed by those interior walls which interlock and also in combination with the inner face of the spine of the holder which has additionally interlocking flange walls thereon. Thus, a cassette placed within the wall sections of one of the trays is automatically aligned and positioned for protective storage as the cover flaps of the holder are interlocked in the holder closed position. In forming the holder 10 of the present invention, the outer flexible cover sheet is gathered slightly between raised parallel ridge portions of the living hinges as the vinyl and PVC plastic sheets are heat sealed together to eliminate wrinkling and stress between the sheets. This unique arrangement provides for a finished product container for cassettes which is attractive, easy to use and economically and efficiently produced.

Another form of the holder of the present invention can be made using only one thermoplastic sheet. The method for creating this alternative holder 10a is illustrated in FIG. 8. The method is the same as described above, except that at the die cut station 128, each pair of spine-connected tray portions 12 and 14 are cut apart. After being severed apart at the die cut station 128, the single sheet albums 10a (as indicated by arrows 180) are then finished products, ready for use. Any marginal scraps 162 are then discarded. Each holder 10a is thus simply comprised of the second thermoplastic sheet 28 formed as described above and shown in the drawing figures. No cover 18 or first thermoplastic sheet 26 is applied to the now molded sheet 28. Thus, the details of the sheet 28 are as shown in FIGS. 3–7, where applicable. Because of the unique form of the single sheet holder 10a, it is still sufficiently rigid to stand alone on edge, even without a cassette mounted therein. In addition, when the holder 10a is formed from clear material (such as a PVC plastic or a high impact styrene), there is only one material fitness to the holder 10a which permits even greater ease in using a bar code reader or the like to poll information from a cassette 70 stored within the holder 10a. The wall sections 30 and 50 are still formed as described, along with the flange stub walls 100 and 102. These components provide a cushion space around the edge of a cassette 70 within the holder 10a to protect it. As formed, the material of the holder 10a has a "memory" which thus allows it to rebound to its originally formed shape when bent or otherwise abused. Thus, a single sheet holder 10a also provides an attractive easy loading and easy-to-use product. In addition, the elimination of a number of production steps results in a much more economically and efficiently produced product than was previously available.

Although the present invention has been described with reference to preferred embodiments, workers skilled in the art will recognize that changes may be made in form and detail without departing from the spirit and scope of the invention.

What is claimed is:

1. A book-like holder comprising:
    a first one-piece flexible sheet having integral front and rear flap portions and an integral spine cover section between the flap portions connecting the flap portions in laterally spaced side-by-side relation;
    a second one piece stiff molded sheet having a raised tray portion on the inner face of each flap portion of said first sheet and an integral spine liner section between the tray portions, the spine liner section connecting the tray portions in laterally spaced side-by-side relation along spaced, generally parallel connecting edges of the spine liner section and covering the spine cover section of said first sheet, the second sheet having a lowered ridge portion defining the connecting edges of the spine liner section and creating a living hinge between each tray portion and the spine liner section; and
    a bond connecting said first and second sheets together around the peripheries thereof except at points immediately adjacent to the lowered ridge portions, and the tray portions on the front and rear flap portions being formed to stack together when the holder is placed in a closed position.

2. The holder of claim 1 wherein each raised tray portion includes an outer wall laterally spaced from the spine liner section and top and bottom walls extending from the outer wall toward the spine liner section, with the walls of the tray portions and the spine liner section cooperating to from an enclosure in the holder when the holder is in its closed position.

3. The holder of claim 2 wherein the outer, top and bottom walls of each tray portion are integrally formed in a C-shape.

4. The holder of claim 2 wherein the spine liner section has a first raised stub wall extending across an inner face thereof in generally parallel alignment to the opposed top walls of adjacent tray portions, and a second raised stub wall extending across the inner face of the spine liner section in generally parallel alignment to the opposed bottom walls of adjacent tray portions.

5. The holder of claim 4 wherein each top wall has an end edge adjacent the spine liner section with each top wall end edge having a recessed channel defined therein aligned to receive and overlap portions of the first stub wall when the holder is in its closed position, and each bottom wall has an end edge adjacent the spine liner section with each bottom wall end edge having a recessed channel defined therein aligned to receive and overlap of the second stub wall when the holder is in its closed position.

6. The holder of claim 4 wherein each top and bottom wall has an inner end adjacent the spine liner section, with the inner end of each top wall recessed to receive portions of the first stub wall therein when the holder is in its closed position, and the inner end of each bottom wall recessed to receive portions of the second stub wall therein when the holder is in its closed position.

7. The holder of claim 4 wherein the first stub wall and adjacent top walls and the second stub wall and adjacent bottom walls are formed to stack together when the holder is in its closed position and form a substantially dust-free enclosure within the holder.

8. The holder of claim 1 wherein those portions of the second sheet which form the spine liner section and inner faces of adjacent tray portions are generally coplanar when the holder is opened to position where the flap portions are generally coplanar and generally perpendicular when the holder is in its closed position.

9. The holder of claim 1 wherein the first and second sheets are transparent.

10. The holder of claim 1 wherein the first sheet is vinyl and the second sheet is PVC plastic, and wherein the bond connecting the peripheries of the first and second sheets is a thermal seal bond.

11. The holder of claim 1, and further comprising:
    a rigid stiffener panel mounted between the flap portion of each first sheet and its respective tray portion of each second sheet.

12. The holder of claim 11 wherein an edge of each rigid stiffener panel abuts one of the lowered ridge portions formed in the second sheet.

13. The holder of claim 1 wherein each raised tray portion includes an outer wall laterally spaced from the spine liner section and top and bottom walls extending from the outer wall toward the spine liner section, and wherein the spine liner section has a first raised stub wall extending across an inner face thereof in generally parallel alignment to the opposed top walls of adjacent tray portions and a second raised stub wall extending across the inner face of the spine liner section in generally parallel alignment to the opposed bottom walls of adjacent tray portions, with the walls of the tray portions, the first and second stub walls and the inner face of the spine liner section cooperating to from an enclosure in the holder when the holder is in its closed position.

14. A method of making a book-like holder which comprises:
   thermal forming a first thermoplastic sheet to define a pair of adjoining stackable trays on a first side of the first sheet, with the trays in side-by-side relation and connected by an integral spine liner section, the thermal forming also defining a pair of parallel raised ridges on a second side of the first sheet, with each of the raised ridges creating a living hinge in the first sheet extending along and defining connecting edges of each tray and the spine liner section;
   cutting a notch out of the periphery of the first sheet at the intersection of each raised ridge with the periphery of the first sheet;
   covering the second side of the first thermoplastic sheet with a second thermoplastic sheet; and
   heat sealing the first and second sheets together around the peripheries thereof so that the peripheries of the first and second sheets are sealed together except at the notches of the first sheet to provide a book-type holder with front and rear cover panels, interlocking trays on the inner faces of the cover panels and a spine connecting the cover panels.

15. The method of claim 14 wherein the first thermoplastic sheet is thermal formed to define a plurality of pairs of adjoining stackable trays.

16. The method of claim 14 wherein the second thermoplastic sheet is more pliable than the first thermoplastic sheet.

17. The method of claim 16 wherein the first thermoplastic sheet is PVC plastic.

18. The method of claim 16 wherein the second thermoplastic sheet is vinyl.

19. The method of claim 14 wherein the first and second thermoplastic sheets are transparent.

20. The method of claim 14, and further including the step of:
   aligning a rigid stiffener panel on the second side of the first sheet to cover the back of each tray prior to covering the first sheet with the second thermoplastic sheet.

21. The method of claim 20 wherein each rigid stiffener panel is aligned by abutting an edge thereof against one of the raised ridges formed in the first sheet.

22. The method of claim 14 wherein each tray is thermal formed to have an integral outer wall laterally spaced from the spine liner section and integral top and bottom walls extending from the outer wall toward the spine liner section with the walls of the tray portions interlocking when the holder is in a closed position to form an enclosure in combination with an inner face of the spine liner section.

23. The method of claim 14 wherein the spine liner section is thermal formed to have a pair of spaced flange stub walls extending across the inner face thereof, with a portion of each flange stub wall in position to overlap a portion of the walls of the trays adjacent the spine liner section when the holder is in its closed position.

24. A method of making a book style holder which comprises:
   thermal forming a first thermoplastic sheet to define a pair of adjoining stackable trays on a first side of the first sheet, with the trays in side-by-side relation and connected by an integral spine liner section, the thermal forming also defining a pair of parallel raised ridges on a second side of the first sheet, with each of the raised ridges creating a living hinge in the first sheet extending along and defining connecting edges of each tray and the spine liner section;
   cutting a notch out of the periphery of the first sheet at the intersection of each raised ridge with the periphery of the first sheet;
   covering the second side of the first thermoplastic sheet with a second thermoplastic sheet; and
   heat sealing the first and second sheets together around the peripheries thereof, except at the notches of the first sheet, to provide a book-type holder with front and rear cover panels, interlocking trays on the inner faces of the cover panels and a spine connecting the cover panels.

25. The method of claim 24 wherein the second thermoplastic sheet is more pliable than the first thermoplastic sheet.

26. The method of claim 24, and further including the step of:
   aligning a rigid stiffener panel on the second side of the first sheet to cover the back of each tray, prior to covering the first sheet with the second thermoplastic sheet.

27. The method of claim 26 wherein each rigid stiffener panel is aligned by abutting an edge thereof against one of the raised ridges formed in the first sheet.

28. The method of claim 24 wherein each tray is thermal formed to have an integral outer wall laterally spaced from the spine liner section and integral top and bottom walls extending from the outer wall toward the spine liner section with the walls of the tray portions interlocking when the holder is in a closed position to form an enclosure in combination with an inner face of the spine liner section.

29. The method of claim 24 wherein the first thermoplastic sheet is thermal formed to define a plurality of pairs of adjoining stackable trays.

30. A method of making book-like holders which comprises:
   thermal forming a first thermoplastic sheet to define a first set of at least two pairs of adjoining stackable trays on a first side of the first sheet, with the trays of each pair of trays in side-by-side relation and connected by an integral spine liner section and with the pairs of trays in tray side-by-side relation and connected by peripheral marginal portions of the first sheet therebetween, the thermal forming also defining a pair of parallel raised ridges for each pair of trays on a second side of the first sheet, with each of the raised ridges creating a living hinge in the first sheet extending along and defining connecting edges of each spine liner section and its respective trays;
   cutting a notch out of the periphery of the first sheet at the intersection of each raised ridge with the periphery of the first sheet;
   aligning at least two first sets of pairs of trays in first set side-by-side relation to define a plurality of second sets of adjacent pairs of trays in tray end-to-end relation;

covering each second set of adjacent pairs of trays in tray end-to-end relation with a separate second thermoplastic sheet;

heat sealing the first and second sheets together around the peripheral margins of each pair of trays so that the peripheries of the first and second sheets are heat sealed together except at the notches of the first sheet; and severing the adjoining pairs of trays along the heat sealed margins to provide a plurality of book-type holders, each with front and rear cover panels, interlocking trays on the inner faces of the cover panels and a spine connecting the cover panels.

* * * * *